(12) United States Patent
Ho

(10) Patent No.: US 10,953,480 B2
(45) Date of Patent: Mar. 23, 2021

(54) SAW BLADE QUICK RELEASE MECHANISM FOR SAWING TOOL AND THE SAWING TOOL USING THE SAME

(71) Applicant: K&W TOOLS CO., LTD., Nantou (TW)

(72) Inventor: Kung-Jung Ho, Nantou (TW)

(73) Assignee: K&W TOOLS CO., LTD., Nantou (TW)

( * ) Notice: Subject to any disclaimer, the term of this patent is extended or adjusted under 35 U.S.C. 154(b) by 76 days.

(21) Appl. No.: 16/422,387

(22) Filed: May 24, 2019

(65) Prior Publication Data
US 2019/0358720 A1 Nov. 28, 2019

(30) Foreign Application Priority Data

May 28, 2018 (TW) .................................. 107118123

(51) Int. Cl.
*B23B 51/04* (2006.01)
*B23B 51/05* (2006.01)

(52) U.S. Cl.
CPC .......... *B23B 51/0473* (2013.01); *B23B 51/04* (2013.01); *B23B 51/05* (2013.01); *B23B 2240/04* (2013.01)

(58) Field of Classification Search
CPC .................. B23B 51/0473; B23B 2240/04
See application file for complete search history.

(56) References Cited

U.S. PATENT DOCUMENTS

| 2,779,361 A | * | 1/1957 | McKiff | B23B 51/0473 408/204 |
| 2,923,180 A | * | 2/1960 | Dunn | B23B 51/0426 408/68 |
| 3,262,474 A | * | 7/1966 | Enders | B23B 51/0473 408/209 |
| 3,880,546 A | * | 4/1975 | Segal | B23B 31/113 408/204 |
| 3,973,862 A | * | 8/1976 | Segal | B23B 51/0473 408/204 |
| 5,167,475 A | * | 12/1992 | Miyanaga | B23B 31/113 408/201 |
| 5,352,071 A | * | 10/1994 | Cochran | B23B 51/0473 408/204 |

(Continued)

FOREIGN PATENT DOCUMENTS

| EP | 1447195 A1 * | 8/2004 | ........ B23B 51/0426 |
| FR | 2860829 A1 * | 4/2005 | ........ B23B 51/0473 |
| JP | 09001413 A * | 1/1997 | ............ B28D 1/041 |

*Primary Examiner* — Eric A. Gates
(74) *Attorney, Agent, or Firm* — Birch, Stewart, Kolasch & Birch, LLP

(57) ABSTRACT

This invention relates to a saw blade quick release mechanism for sawing tool and a sawing tool using same, the mechanism comprising a saw blade mount, a rotary cover rotatable on the saw blade mount, a resilient member holding the rotary cover in position, and a positioning component having a positioning member on either of the saw blade mount and the rotary cover and a positioning slot on the other one thereof whereby in case of the rotary cover positioned, the positioning member is at the positioning end of the positioning slot, and the saw blade cannot be disassembled then, while in case of the rotary cover disassembled, the positioning member is at a release end thereof, and the saw blade can be disassembled then.

9 Claims, 13 Drawing Sheets

(56) References Cited

U.S. PATENT DOCUMENTS

| | | | | |
|---|---|---|---|---|
| 5,788,430 A * | 8/1998 | Meyen | ................ | B23B 51/0473 |
| | | | | 175/381 |
| 9,144,847 B2 * | 9/2015 | Tseng | .................. | B23B 51/0473 |
| 2004/0179911 A1 * | 9/2004 | Keightley | ............. | B23B 31/113 |
| | | | | 408/204 |
| 2019/0151959 A1 * | 5/2019 | Ho | ...................... | B23B 51/0473 |

* cited by examiner

SAW BLADE QUICK RELEASE MECHANISM FOR SAWING TOOL AND THE SAWING TOOL USING THE SAME

BACKGROUND OF THE INVENTION

1. Technical Field

The present invention relates to a saw blade quick release mechanism for sawing machine, particularly to a sawing tool using same.

2. Description of Related Art

For sawing tools (such as hacksaws or rotary saws) in general, the saw blade will wear out over time, as a result of which the user has to change the saw blade from time to time to keep the saw blade sharp. However, in the prior art, the replacement of the saw blade involves many different members, resulting in an overcomplicated structure, a quite cumbersome operation, and a little bit of risk in the process of disassembling the saw blade.

BRIEF SUMMARY OF THE INVENTION

The primary object of the present invention is to provide a saw blade quick release mechanism for sawing tool, which is simple in structure and convenient in operation, and can enhance the convenience and safety in use.

To achieve the above primary object, the saw blade quick release mechanism of the present invention comprises a saw blade mount, a rotary cover, a resilient member and a positioning component. The saw blade mount is used to be assembled and fixed with a saw blade. The rotary cover is rotatably provided on the saw blade mount and is rotatable between a positioning position and a disassembling position relative to the saw blade mount. The resilient member works on the rotary cover for providing a resilient force to hold the rotary cover fit in the positioning position. The positioning component has a positioning member and a positioning slot which has a positioning end and a release end, wherein the positioning member is provided on either of the blade mount and rotary cover while the positioning slot is provided on the other of the saw blade mount and rotary cover. And the positioning slot has a positioning end and a release end wherein when the rotary cover is located at the positioning position, the positioning member is set at the positioning end of the positioning slot and cannot be disassembled relative to the saw blade at this time, however when the rotary cover is located at the disassembling position, the positioning member is set at the release end of the positioning slot and can proceed disassembly at this time.

As comprehensible from the above, when the used saw blade is to be replaced, it can be disassembled from the saw blade mount by rotating the rotary cover to the disassembling position, and the new saw blade can be reassembled onto the saw mount. After the assembly is completed, the rotary cover can be rotated to the positioning position. Overall, it is not only simplified in structure, but also convenient in operation, and the enhancement of convenience in use can be achieved.

In the first embodiment of the invention, the sawing tool is a hacksaw, wherein the positioning member is provided on the saw blade mount, while the positioning slot is on the rotary cover. Furthermore, the saw blade mount has a mount body and a stop screw, wherein the mount body has a fixing hole for the positioning member to be mounted therein, one end of the mount body having a saw blade fixing slot, and the other end thereof having a threaded hole, while the stop screw has a head portion and a screw portion connected to the head portion and screwed to the screw hole of the mount body. The rotary cover has a collar provided on the mount body and a handle connected to the collar. The resilient member is a compression spring, which is sleeved on the mount body and abuts between the head portion of the stop screw and the collar of the rotary cover. The positioning slot further has an obliquely extending segment connecting the positioning end and release end, and the distance from the positioning end of the positioning slot to the stop screw is smaller than that from the release end of the positioning slot to the stop screw. Thereby, when the rotary cover is rotated from the positioning position to the disassembly position by means of the handle of the rotary cover, since the positioning member is kept stationary, the rotary cover can take advantage of the obliquely extending segment of the positioning slot in the rotating process along the length of the mount body of the saw blade mount to move toward the stop screw, thereby emptying out a sufficient space for the saw blade to be disassembled.

In the second embodiment of the invention, the sawing tool is a rotary saw, wherein the positioning member is provided on the rotary cover, while the positioning slot on the saw blade mount. Furthermore, the rotary cover has a fixing hole for the positioning member to be mounted therein, while the saw blade mount has a mount body and a push cover vertically displaceably provided on the mount body. The resilient member is a wave spring which abuts against an inner flange of the rotary cover. The positioning slot is inverted L-shaped and has a positioning segment and an opening segment, wherein the positioning segment has the positioning end and release end, while the bottom end of the opening segment is coupled to the release end of the positioning segment. Thereby, after the rotary cover is rotated from the positioning position to the disassembly position, since the positioning slot is kept stationary, the positioning member can be disassembled from the positioning slot via the opening segment, and then the rotary cover and saw blade mount can be separated, while the push cover of the blade holder can be pushed away from the blade to provide sufficient space for the saw blade to be disassembled from the saw blade mount.

The detailed configuration, features, component or use of the saw blade quick release mechanism for sawing tool and a sawing tool using same according to the present invention will be described in the detailed description of the subsequent embodiments. However, it should be understood by those of ordinary skill in the art that the detailed description and the particular embodiments as mentioned for implementing the present invention do not intend to limit the scope of the invention.

DETAILED DESCRIPTION OF THE INVENTION

Hereby the applicant firstly clarifies that, in the embodiments and drawings to be described below, the same or similar reference numbers indicate the same or similar elements or their structural features.

Figure 1:
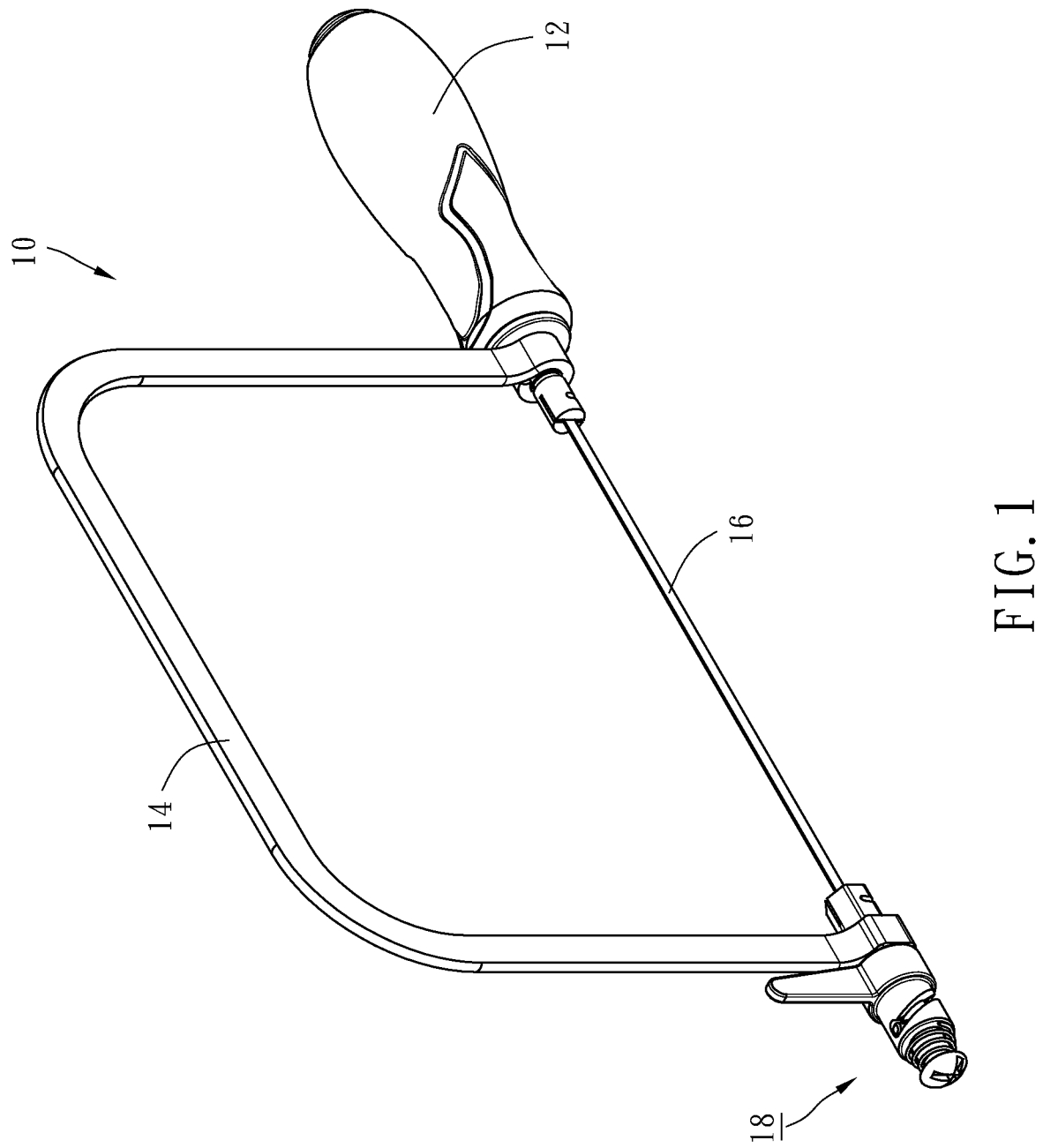
FIG. 1 is a perspective view showing the appearance of a sawing tool using a saw blade quick release mechanism according to a first embodiment of the present invention.
Figure 2:
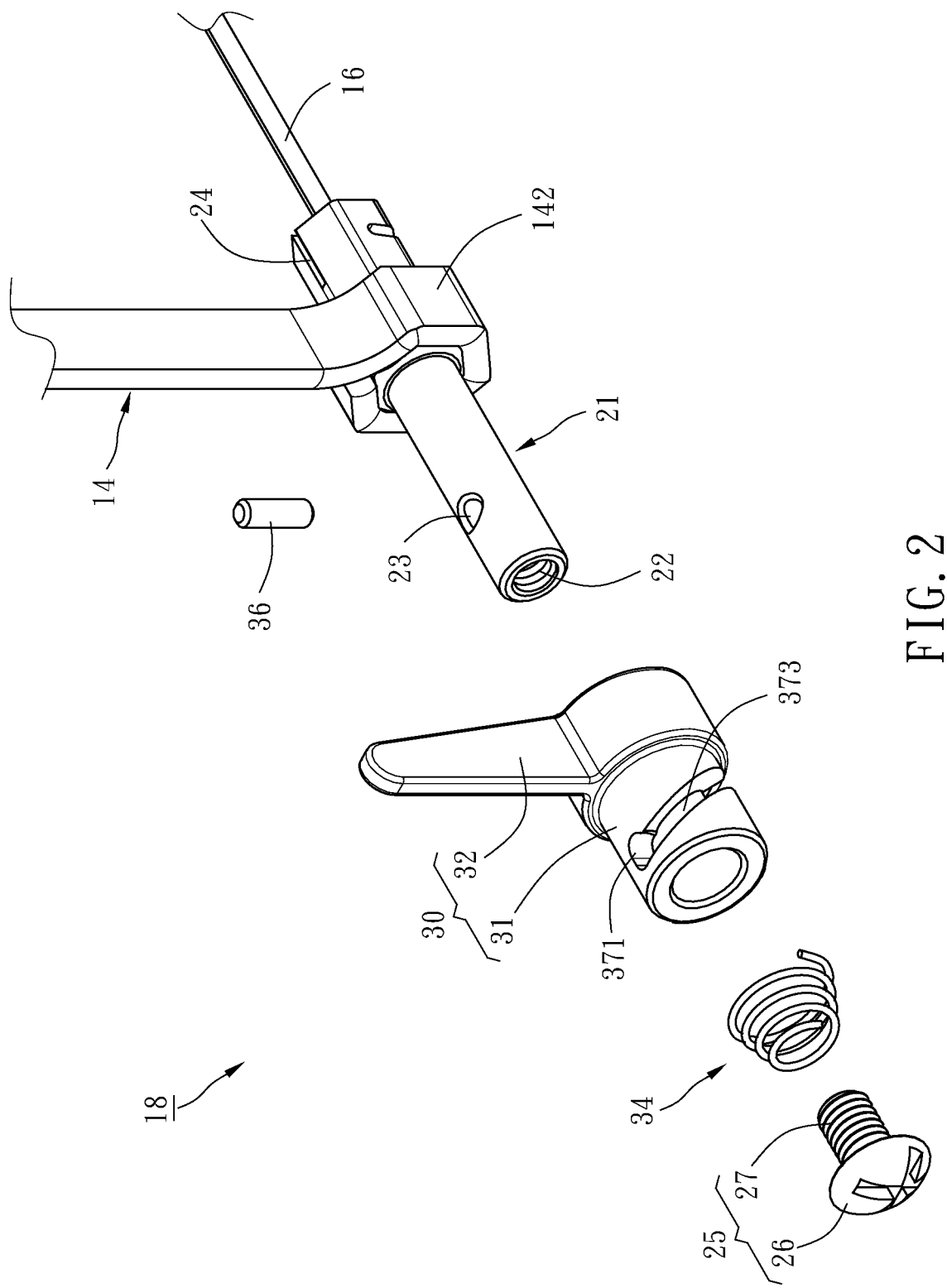
FIG. 2 is an exploded perspective view of the saw blade quick release mechanism according to the first embodiment of the present invention.
Figure 3:
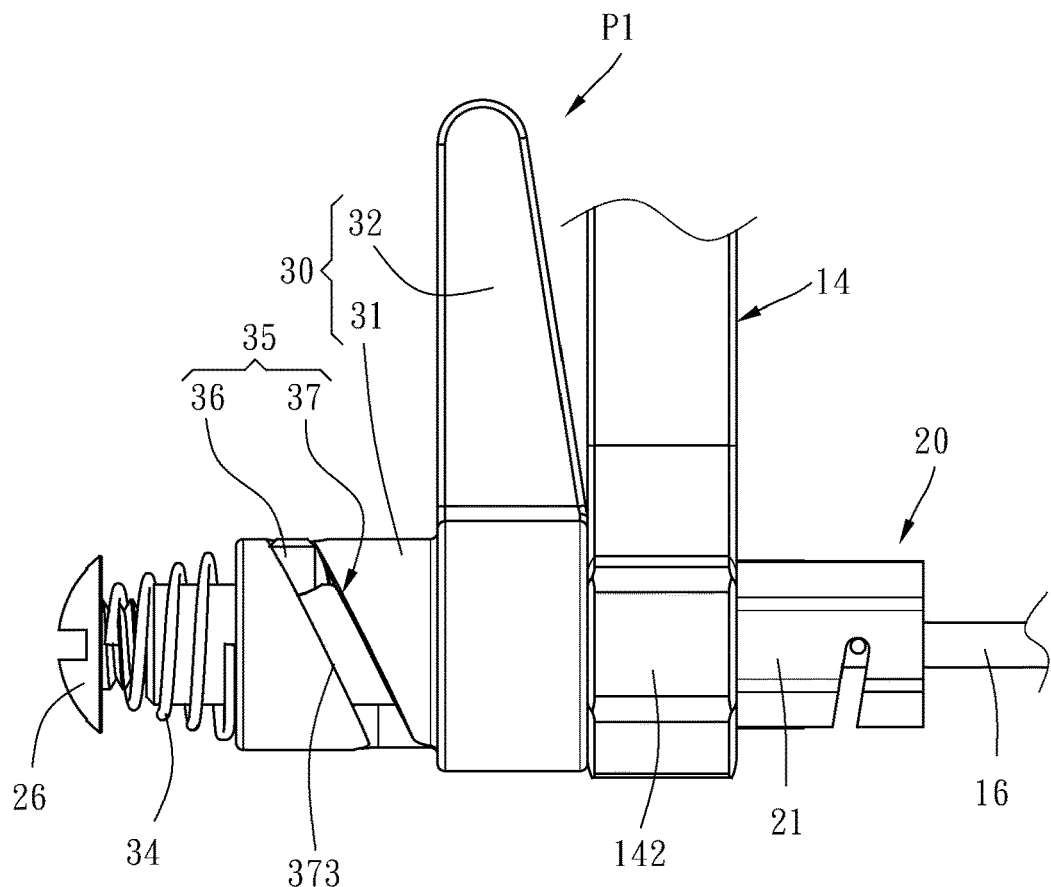
FIG. 3 is a side view of the saw blade quick release mechanism according to the first embodiment of the present invention, mainly showing the rotary cover located at the positioning position.

Referring to FIG. 1, the sawing tool 10 as shown in this figure is a hack saw whose structure mainly comprises a handle 12, a C-shaped saw frame 14 and an elongated saw blade 16. Since the hacksaw is a conventional technique, the applicant does not repeat the structural relationship between the aforementioned elements. Referring to FIGS. 2 and 3, a blade quick release mechanism 18 of the first embodiment of the present invention comprises a saw blade mount 20, a rotary cover 30, a resilient member 34, and a positioning component 35.

The blade mount 20 has a mount body 21 and a stop screw 25. The mount body 21 having an elongated shape is provided at a front end 142 of the saw frame 14. The front end of the base body 21 has a screw hole 22 and a fixing hole 23 adjacent to the screw hole 22. The rear end of the mount body 21 has a saw blade fixing slot 24 which is used to insert and fix the front end of the saw blade 16. The stop screw 25 has a head portion 26 and a screw portion 27 integrally connected to the head portion 26 and screwed into the screw holes 22 of the mount body 21.

The rotary cover 30 has a collar 31 and a handle 32. The collar 31 is rotatably sleeved on the mount body 21 of the saw blade mount 20 and movable between the front end 142 of the saw frame 14 and the head portion 26 of the stop screw 25 along the longitudinal direction of the mount body 21 of the saw blade mount 20. The handle 32 with one end coupled to the collar 31 is subject to the external force for the rotary cover 30 to rotate relative to the saw blade mount 20.

The resilient member 34 which is a compression spring in this embodiment is sleeved on the mount body 21 of the saw blade mount 20 and abuts between the head portion 26 of the stop screw 25 of the blade holder 20 and the collar 31 of the rotary cover 30 to provide a resilient force to push the rotary cover 30 toward the front end 142 of the saw frame 14.

The positioning component 35 has a positioning member 36 and a positioning slot 37 embedded in the positioning member 36. In this embodiment, the positioning member 36 is provided on the mount body 21 of the saw blade mount 20, while the positioning slot 37 on the collar 31 of the rotary cover 30. More specifically, as shown in FIGS. 1, 3 and 5, one end of the positioning member 36 is inserted into the fixing hole 23, while the other end of the positioning member 36 protrudes out of the fixing hole 23. The positioning slot 37 has a positioning end 371, a release end 372 and an obliquely extending segment 373 connecting the positioning end 371 and release end 372, wherein, as shown in FIGS. 3 to 6, the distance from the positioning end 371 of the positioning slot 37 to the stop screw 25 is smaller than that from the release end 372 of the positioning slot 37 to the stop screw 25.

Figure 4:
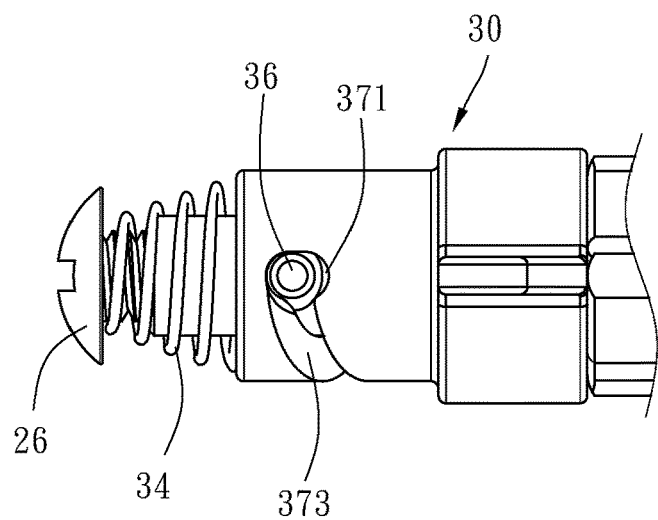
FIG. 4 is a top view of FIG. 3.
Figure 5:
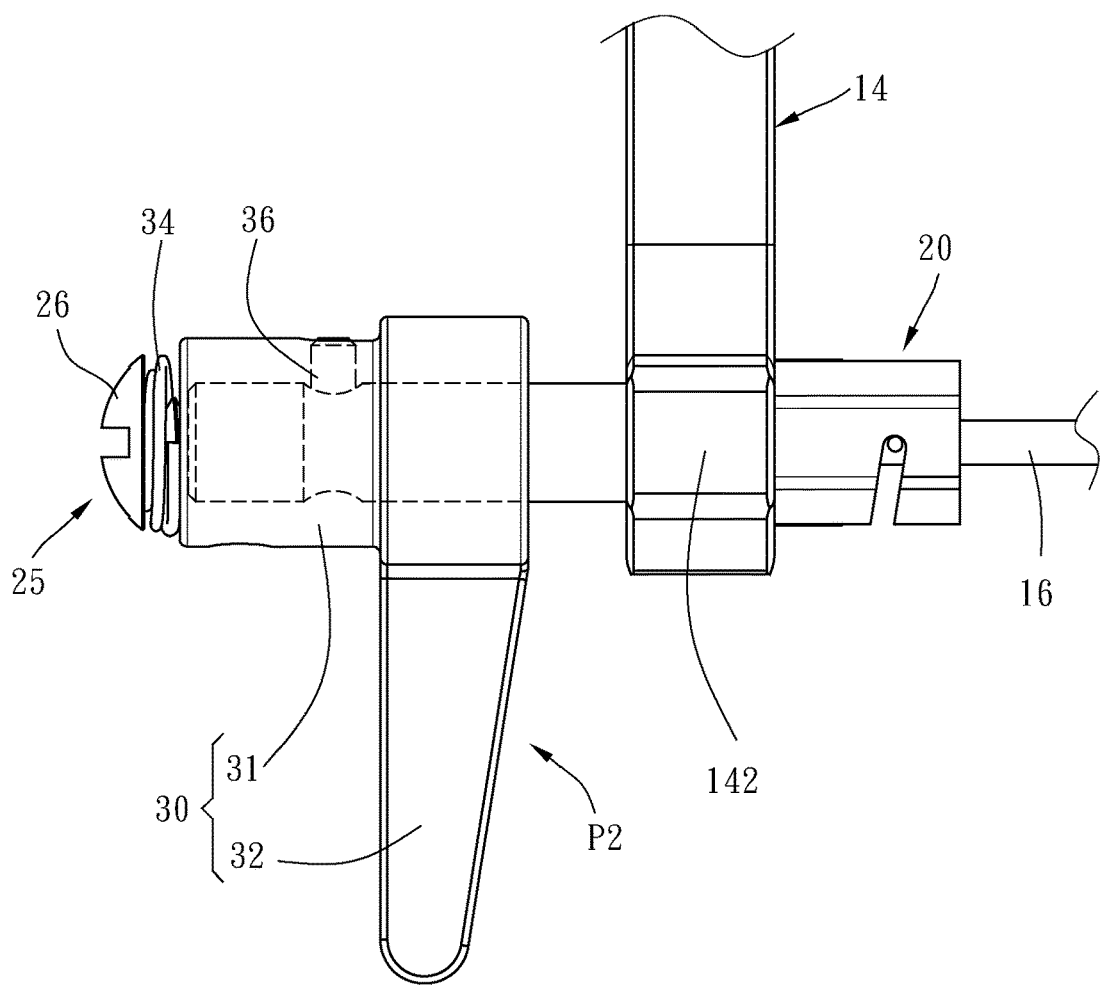
FIG. 5 is similar to FIG. 3, mainly showing the rotary cover in the disassembly position.
Figure 6:
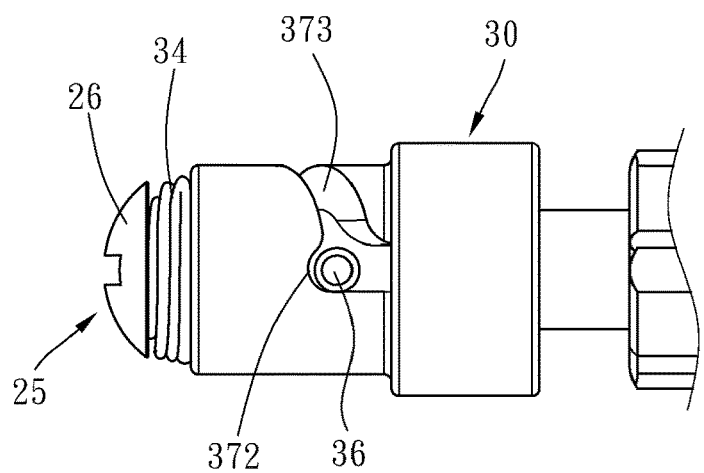
FIG. 6 is a top view of FIG. 5.

As comprehensible from the above, when the saw blade 16 is to be replaced, the rotary cover 30 is rotated by means of the handle 32 of the rotary cover 30 from one of the positioning positions P1 as shown in FIGS. 3 and 4 to either of the positions P2 as shown in FIGS. 5 and 6. Since the positioning member 36 remains stationary, the rotary cover 30 is moveable toward the stop screw 25 along the longitudinal direction of the mount body 21 of the saw blade mount 20 by means of the obliquely extending segment 373 of the positioning slot 37 during rotation until the positioning member 36 is embedded in the release end 372 of the positioning slot 37, where the rotary cover 30 stops moving. At this time, on one hand, the collar 31 of the rotary cover 30 presses the resilient member 34 to accumulate the restoring force of the resilient member 34, and on the other hand, there will be a spacing split between the collar 31 of the rotary cover 30 and the front end 142 of the saw frame 14 by means of which the saw blade 16 can be released from the saw blade mount 20 and disassembled for replacement.

After a used saw blade is replaced with new one, the rotary cover 30 is rotated by means of the handle 32 of the rotary cover 30 from the disassembly position P2 as shown in FIGS. 5 and 6 to the positioning position P1 as shown in FIGS. 3 and 4. Since the positioning member 36 remains stationary likewise, the rotary cover 30 moves toward the front end 142 of the saw frame 14 along the longitudinal direction of the mount body 21 of the saw blade mount 20 during rotation by means of the obliquely extending portion 373 of the positioning slot 37. Till the positioning member 36 is embedded in the positioning end 371 of the positioning slot 37, the restoring force released by the resilient member 34 acts on the collar 31 of the rotary cover 30 for the collar 31 of the rotary cover 30 to abut against the front end 142 of the saw frame 14. At this time there is no room for the saw blade mount 20 to release the saw blade 16, thereby completing the fixation of the saw blade 16

Figure 7:
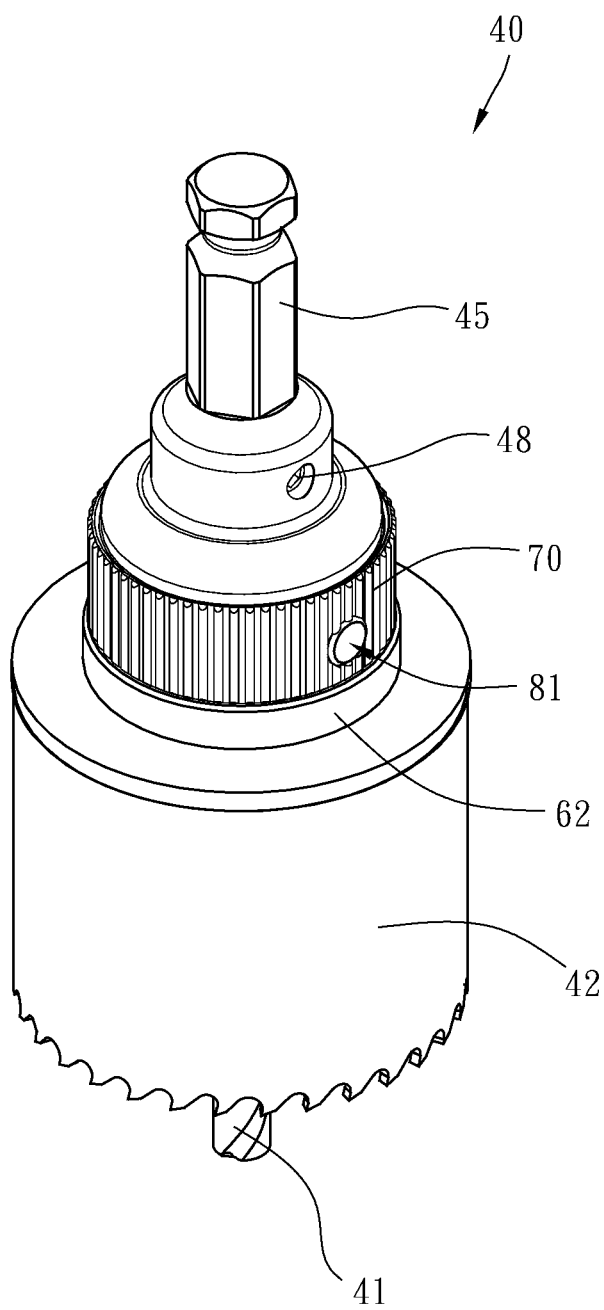
FIG. 7 is a perspective view showing the appearance of a sawing tool using the saw blade quick release mechanism of the second embodiment of the present invention.

Referring to FIG. 7, the sawing tool 40 as shown is a rotary saw, which mainly drills a work piece (not shown) by means of a drill bit 41 to obtain a fulcrum, and cuts a circular hole into the work piece by means of a circular saw blade 42 provided around the drill bit 41, wherein the tip end of the drill bit 41 penetrates into a drill holder 45 and is fixed to the drill holder 45 by means a tightening screw 48. Further referring to FIG. 8, the saw blade quick release mechanism 50 according to the second embodiment of the present invention comprises a saw blade mount 60, a rotary cover 70, a resilient member 76, and a positioning component 80.

Figure 8:
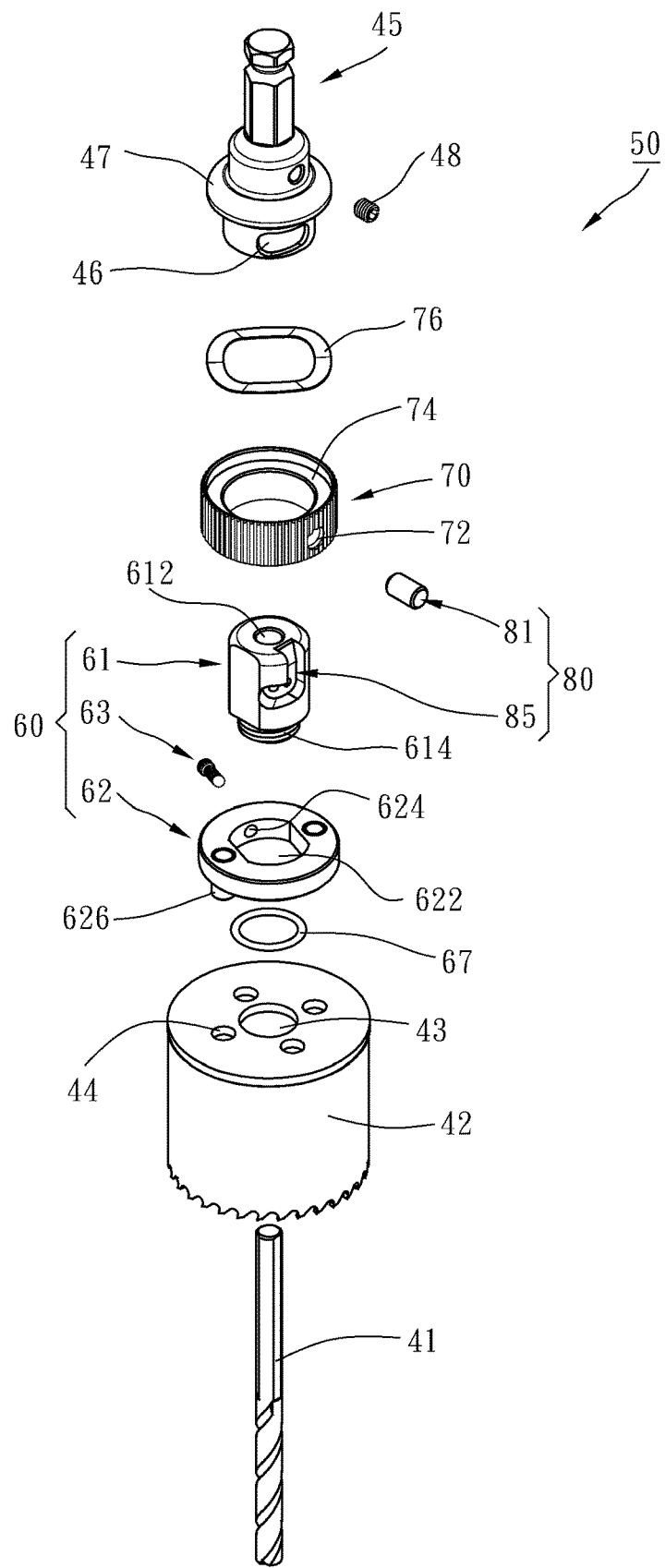
FIG. 8 is an exploded perspective view of FIG. 7.
Figure 9:
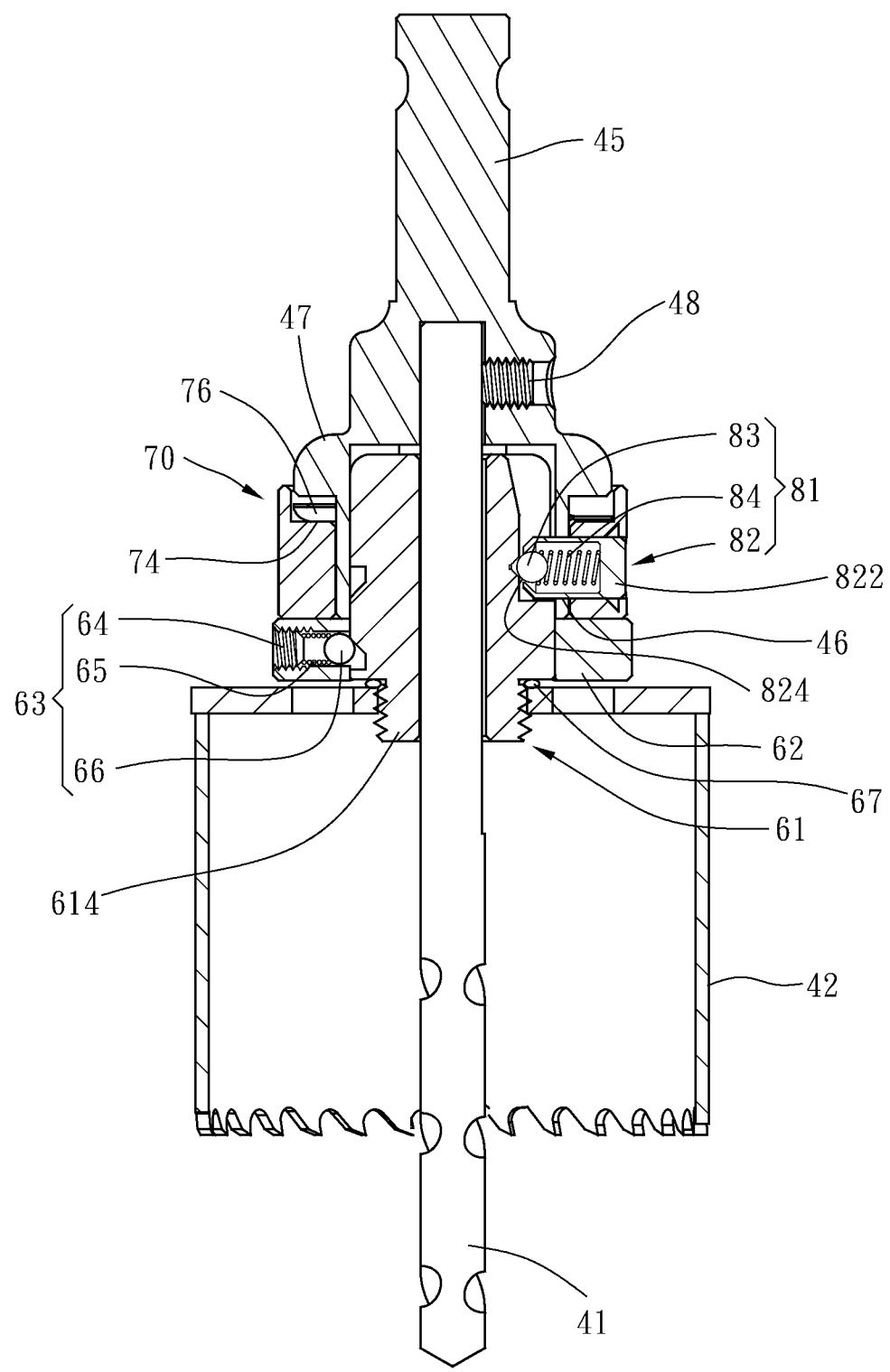
FIG. 9 is a cross-sectional combination view of FIG. 7.

The saw blade mount 60 has a mount body 61, a push cover 62, and a limit member 63, wherein:

The cross-segmental shape of the mount body 61 is non-circular. As shown in FIGS. 8 and 9, the mount body 61 which is sleeved by the drill holder 45 has an axial hole 612 bored through both the top and bottom ends for the drill bit 41 to be pierced through. The mount body 61 has a threaded portion 614 at the bottom end while the mount body 61 is screwed by means of one of the screw holes 43 of the saw blade 42 with the threaded portion 614, whereby both of them are detachably assembled together, and the threaded portion 614 of the mount body 61 can be sleeved with a resilient washer 67 which can provide a cushioning effect upon sawing on one hand, and enhance the fixing strength between the mount body 61 and the saw blade 42 on the other hand. In addition, as shown in FIGS. 14 to 17, the outer circumferential surface of the mount body 61 has an upper limit slot 616 and a lower limit slot 618.

Figure 16:
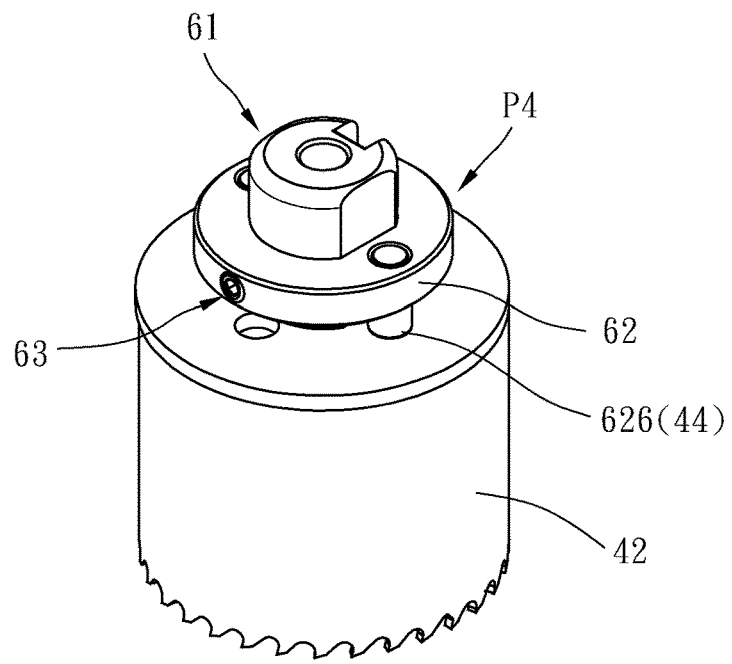
FIG. 16 is similar to FIG. 14, mainly showing the push cover in the separation position.

The push cover 62 has a non-circular sleeve hole 622. The push cover 62 is sleeved on the mount body 61 by means of the sleeve hole 622 and movable up and down relative to the mount body 61 but unable to rotate relative to the mount body 61. The push cover 62 has an accommodating hole 624 (hereinafter referred as a screw hole) extending through the inner and outer circumferential surfaces thereof, and the bottom end of the push cover 62 has two bottom posts 626 by either of which the push cover 62 is inserted into a top hole 44 (as shown in FIGS. 8 and 16) of the saw blade 42.

Figure 14:
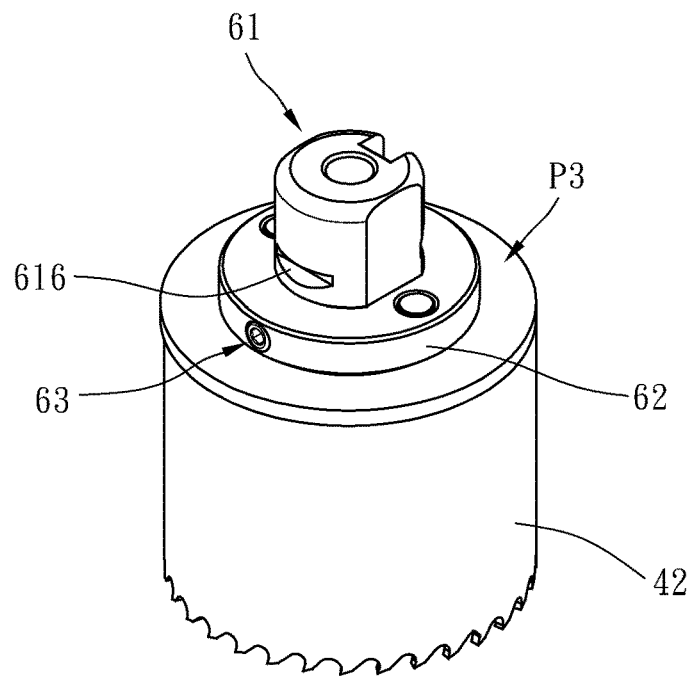
FIG. 14 is a partial perspective view of the saw blade quick release mechanism according to the second embodiment of the present invention, mainly showing the push cover in an abutting position.
Figure 15:
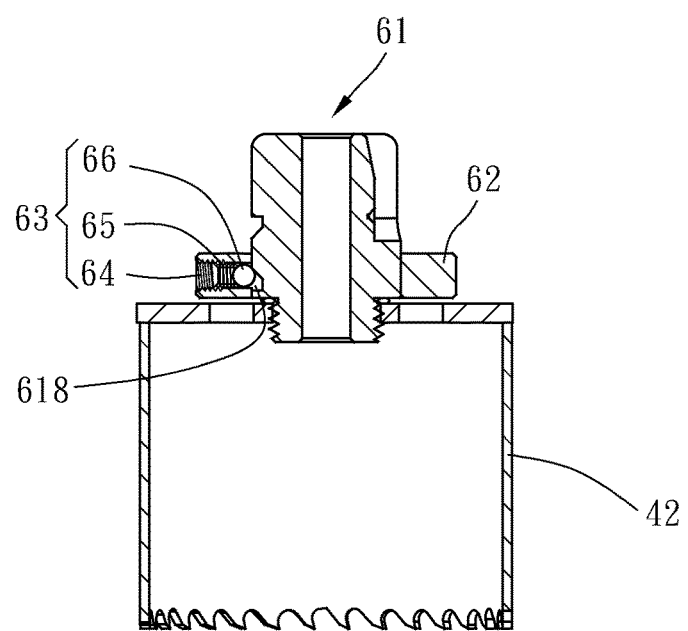
FIG. 15 is a cross-sectional view of FIG. 14
Figure 17:
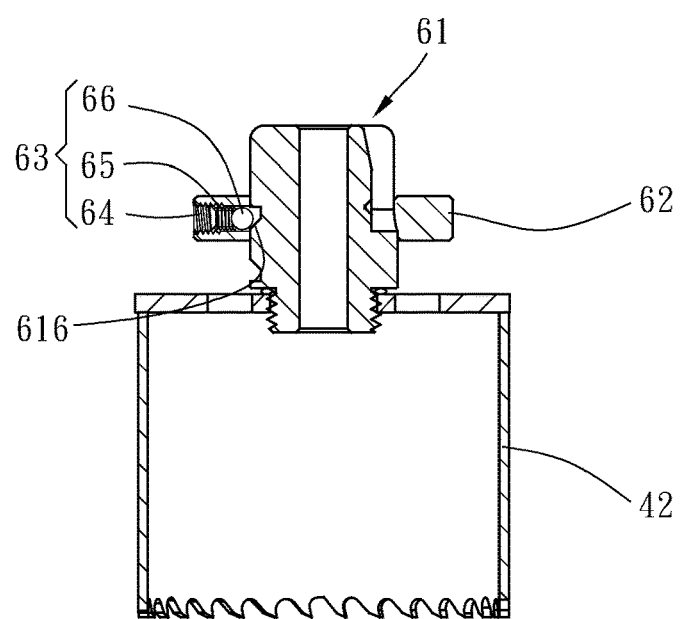
FIG. 17 is a cross-sectional view of FIG. 16.

The limiting member 63 has an adjusting screw 64, a first resilient positioning member 65 and a limiting ball 66. As shown in FIGS. 8 and 9, the adjusting screw 64 is screwed in the accommodating hole 624 of the push cover 62, while the first resilient member 65 is provided between the adjusting screw 64 and the limiting ball 66 to provide a resilient force to push the limiting ball 66 toward the mount body 61. When the limiting ball 66 is embedded in the lower limit slot 618 of the mount body 61, as shown in FIGS. 14 and 15, the push cover 62 is located at an abutment position P3 wherein the bottom surface of the push cover 62 abuts against the top surface of the saw blade 42. When the limit ball 66 is embedded in the upper limit slot 616 of the mount body 61, as shown in FIGS. 16 and 17, the push cover 62 is located at a separation position P4 wherein there is a predetermined distance between the bottom surface of the push cover 62 and the top surface of the saw blade 42. In addition, by adjusting the screw engagement relationship between the adjusting screw 64 and the accommodating hole 624, the abutting force the limit ball 66 exerts against the upper and lower limit slots 616, 618 can be adjusted, thereby adjusting the tightness of the push cover 62 in positioning.

As shown in FIGS. 8 and 9, the rotary cover 70 is sleeved on the mount body 61 of the saw blade mount 60 and provided adjacent to the lower side of the drill holder 45. The rotary cover 70 has a fixing hole 72 extending through the inner and outer circumferential surfaces thereof, and the inner circumferential surface of the rotary cover 70 has an inner flange 74 above the fixing hole 72.

The resilient member 76 is a wave spring in this embodiment. As shown in FIGS. 8 and 9, the resilient member 76 is provided between an outer flange 47 of the drill holder 45 and the inner flange 74 of the rotary cover 70 for exerting a resilient force to the rotary cover 70 to avoid the rotary cover 70 to get loose.

Figures 10, 11:
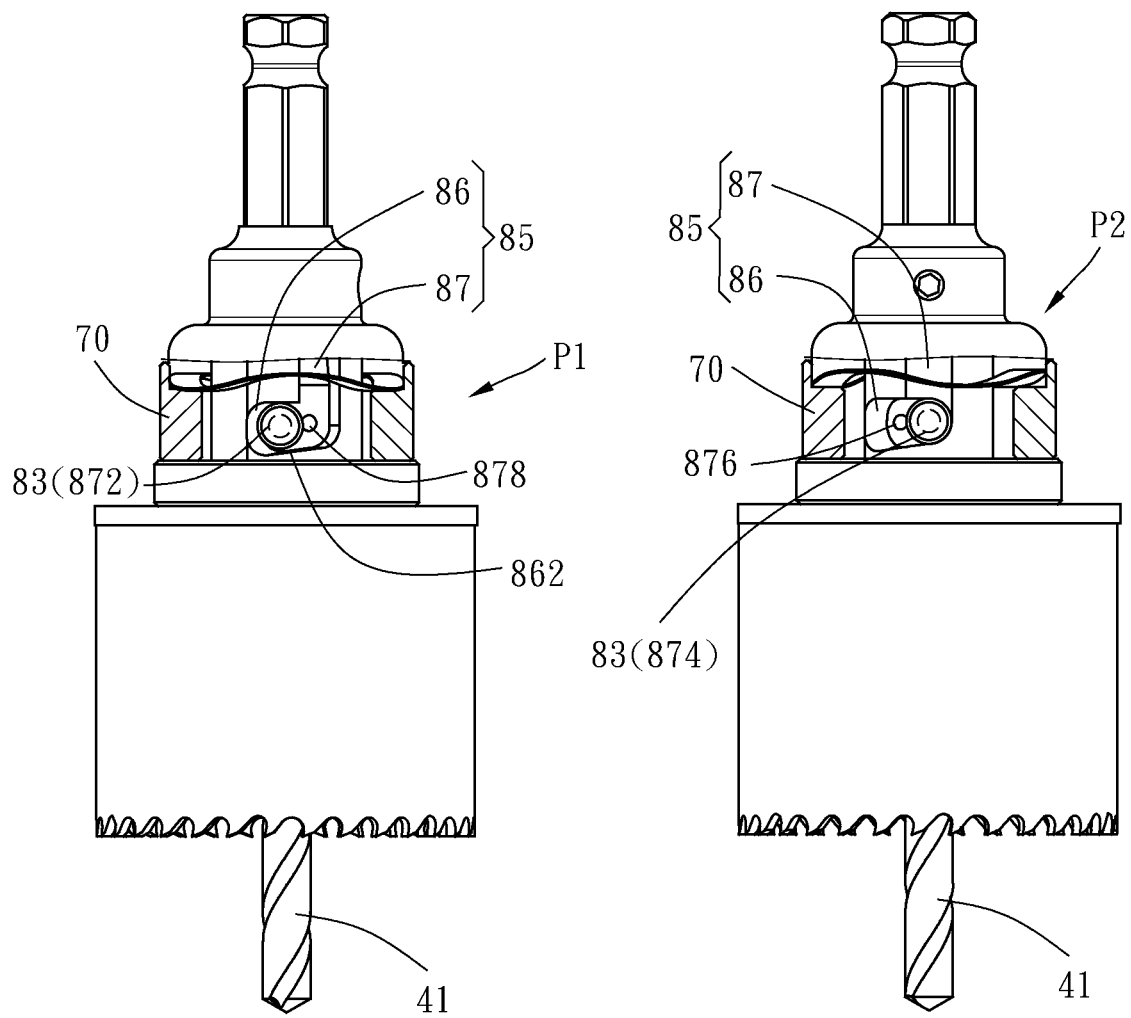
FIG. 10 is a partial cross-sectional view of the saw blade quick release mechanism according to the second embodiment of the present invention, mainly showing the rotary cover located at the positioning position.
FIG. 11 is similar to FIG. 10, mainly showing the rotary cover in the disassembly position.
Figure 12:
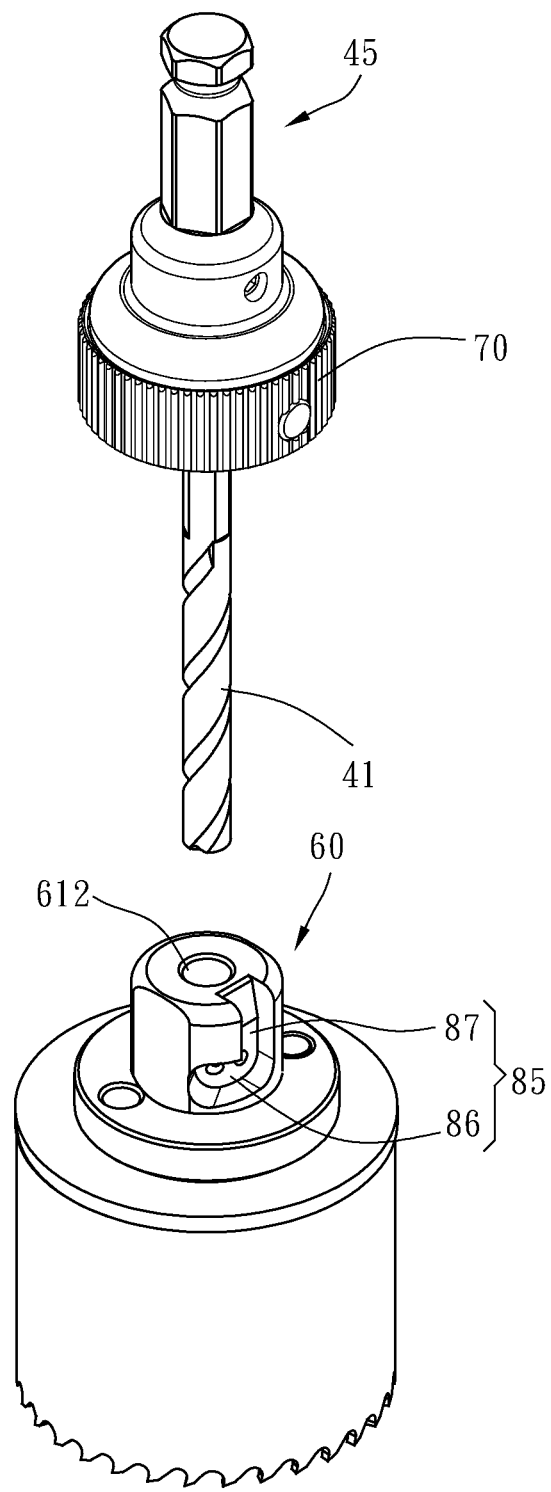
FIG. 12 is a partially exploded perspective view of the saw blade quick release mechanism according to the second embodiment of the present invention, mainly showing the saw blade mount and rotary cover separated from each other.

The positioning component 80 has a positioning member 81 and a positioning slot 85 embedded in the positioning member 81. In the embodiment, the positioning member 81 is provided on the rotary cover 70, and the positioning slot 85 on the outer circumferential surface of the mount body 61 of the saw blade mount 60. More specifically, as shown in FIGS. 8 and 9, the positioning member 81 has a sleeve 82, a positioning ball 83 and a second resilient positioning member 84, wherein the sleeve 82 is provided through the fixing hole 72 of the rotary cover 70 and an elongated hole 46 of the drill holder 45 to, on one hand, enable the sleeve 82 to be actuated along with the rotary cover 70, and on the other hand, assemble the rotary cover 70 with the drill holder 45. In addition, the sleeve 82 has an end wall 822 and an opening 824 opposite to the end wall 822. The positioning ball 83 partially protrudes out of the sleeve 82 through the opening 824, while the second resilient positioning member 84 is provided in the sleeve 82 and abuts between the end wall 822 of the sleeve 82 and the positioning balls 83 to exert a resilient force to push the positioning balls 83 toward the positioning slot 85. As shown in FIGS. 10 to 12, the positioning slot 85 in an inverted L shape has a positioning segment 86 and an opening segment 87 wherein the positioning segment 86 has a positioning end 872 and a release end 874, the positioning segment 86 further having an inclined bottom wall 862. The inclined bottom wall 862 extends downward from the release end 874 toward the positioning end 872. As for the extending direction of the opening segment 87, it is parallel to the axial direction of the drill bit 41, and the bottom end of the opening segment 87 is vertically engaged with the release end 874 of the positioning segment 86. In addition, the wall of the positioning end 872 has a first recess 876, and the wall of the release end 874 has a second recess 878. The first and second recesses 876, 878 are used to position the positioning ball 83 in an embedding manner.

Figure 13:
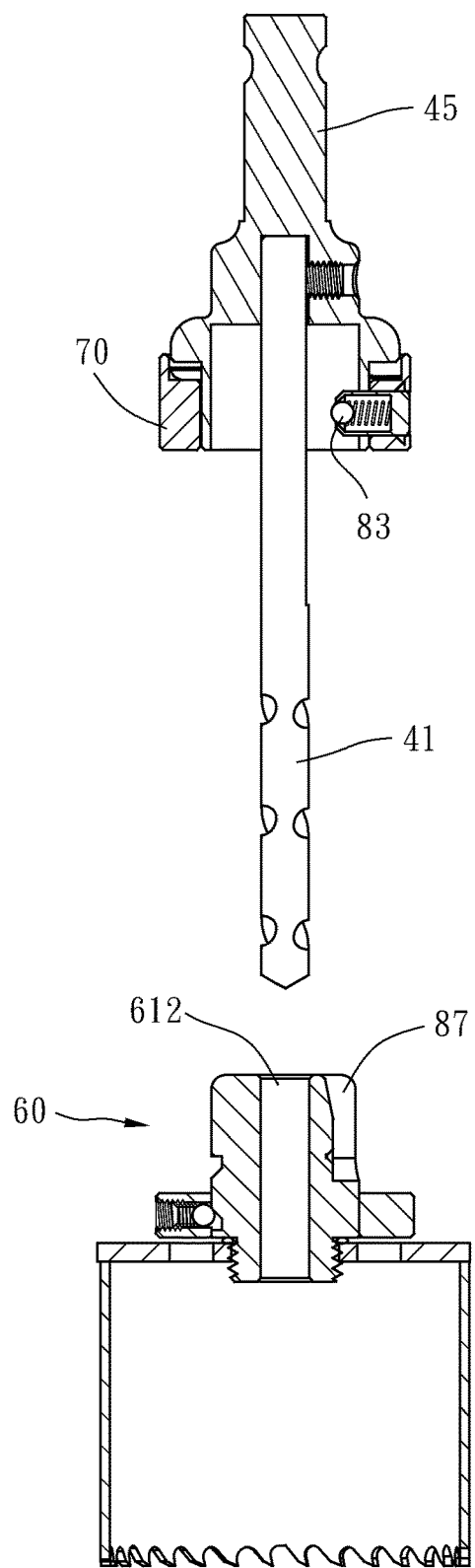
FIG. 13 is a cross-sectional view of FIG. 12.
Figure 18:
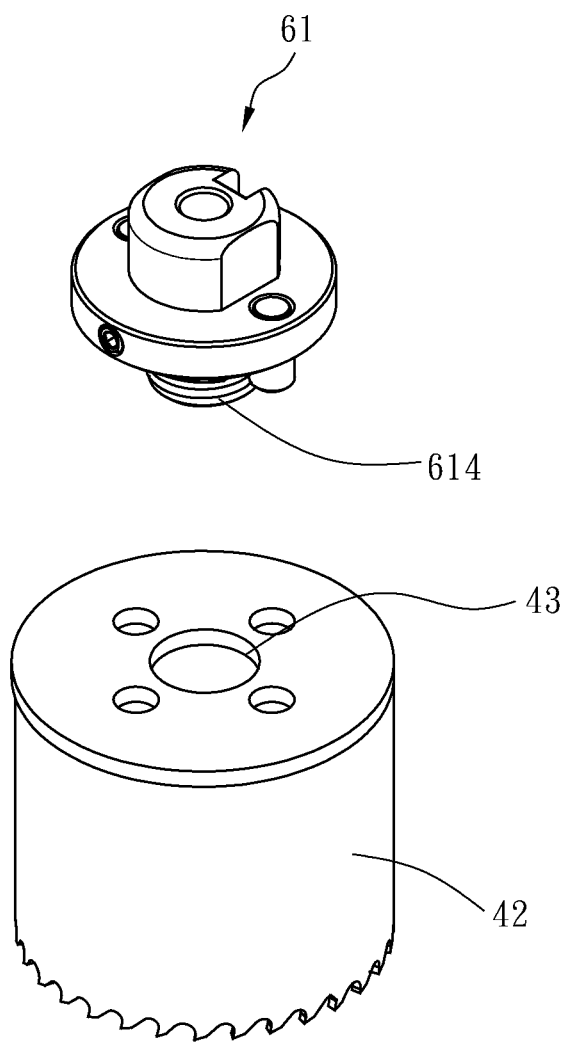
FIG. 18 is a partially exploded perspective view of the saw blade quick release mechanism according to the second embodiment of the present invention, mainly showing the saw blade disassembled from the saw blade mount.

As comprehensible from the above, when the saw blade 42 is to be replaced, the rotary cover 70 is firstly rotated from the positioning position P1 as shown in FIG. 10 to the disassembly position P2 as shown in FIG. 11 for the positioning member 81 to move from the positioning end 872 of the positioning segment 86 of the positioning slot 85 to the release end 874 of the positioning segment 86 of the positioning slot 85. At this time, the positioning ball 83 corresponding to the opening segment 87 of the positioning slot 85 will not be limited by the positioning segment 86 of the positioning slot 85 but instead, can be disengaged from the positioning slot 85 through the opening portion 87 of the positioning slot 85. Subsequently, the rotary cover 70 is pulled upward as shown in FIGS. 12 and 13 for the rotary cover 70 together with the drill holder 45 and the drill bit 41 to be separated from the saw blade mount 60. And then the push cover 62 is pulled upward from the abutment position P3 as shown in FIGS. 14 and 15 to the separation position P4 as shown in FIGS. 16 and 17. At this time, both of them can be separated by the screw engagement relationship between the mount body 61 of the saw blade mount 60 and the saw blade 42, as shown in FIG. 18, thus completing the disassembly of the saw blade 42.

Upon reinstalling a new saw blade, firstly the mount body 61 of the saw blade mount 60 and the saw blade 42 are assembled through their screw engagement relationship. Subsequently, the push cover 62 is pushed downward from the separation position P4 as shown in FIGS. 16 and 17 to the abutment position P3 as shown in FIGS. 14 and 15 for the bottom post 626 of the push cover 62 to be inserted into the top hole 44 of the saw blade 42. Since at this time, the drill holder 45, the rotary cover 70, the positioning member 81 and drill bit 41 are still assembled together, on one hand, the drill bit 41 is bored in the axial hole 612 of the mount body 61 of the saw blade mount 60, and on the other hand, the positioning ball 83 is inserted into the release end 874 of the positioning segment 86 of the positioning slot 85 via the opening segment 87 of the positioning slot 85. Finally the rotary cover 70 is rotated from the disassembly position P2 as shown in FIG. 11 to the positioning position P1 as shown in FIG. 10 for the positioning ball 83 to be embedded at the positioning end 872 of the positioning segment 86 of the positioning slot 85. At this time, the resilient member 76 can keep the rotary cover 70 in position to avoid looseness, thus completing the fixation of the saw blade 42. The engagement relation between the sleeve 82 of the positioning member 81 and inclined bottom wall 862 of the positioning segment 86 of the positioning slot 85 can be further utilized to enhance the tightening effect between the rotary cover 70 and push cover 62.

In summary of the above, if the saw blades 16, 42 are to be replaced, they can be disassembled by the rotary cover 30, 70 to the disassembly position P2. After a new saw blade is reassembled, the rotary covers 30, 70 are rotated to the positioning position P1. In other words, the blade quick release mechanism 18, 50 of the present invention not only effectively simplifies the structure, but also the disassembling process of the saw blades 16, 42 is quite convenient and safe, thereby achieving the objects to enhance the convenience in use and safety in operation.

What is claimed is:

1. A saw blade quick release mechanism for sawing tool, comprising:
    a saw blade mount;
    a rotary cover, which is rotatably sleeved between a positioning position and a disassembly position;
    a resilient member acting on said rotary cover to hold said rotary cover in said positioning position;
    a positioning component having a positioning member and a positioning slot, wherein said positioning member is provided on either of said saw blade mount and said rotary cover, while said positioning slot is provided on the other one of said saw blade mount and said rotary cover, said positioning slot having a positioning end and a release end, wherein when said rotary cover is located at said positioning position, said positioning member is set at the positioning end of said positioning slot, however when said rotary cover is located at said disassembly position, said positioning member is set at said release end of said positioning slot,
    wherein said positioning member is provided on said rotary cover, while said positioning slot on said saw blade mount, and,
    wherein said rotary cover has a fixing hole; said saw blade mount has a mount body and a push cover vertically displaceably provided on said mount body; and said mount body is sleeved by said rotary cover, while said push cover abuts against the bottom edge of said rotary cover; and said positioning member is provided on said fixing hole of said rotary cover, while said positioning slot is provided on the outer circumferential surface of said mount body.

2. A saw blade quick release mechanism for sawing tool as claimed in claim 1, wherein the bottom end of said mount body has a threaded portion, while the threaded portion of said mount body is sleeved with a resilient washer.

3. A saw blade quick release mechanism for sawing tool as claimed in claim 1, wherein said rotary cover has an inner flange above said fixing hole, and said resilient member presses against said inner flange of said rotary cover.

4. A saw blade quick release mechanism for sawing tool as claimed in claim 1, wherein said mount body of said saw blade mount has an upper limit slot and a lower limit slot, while said push cover of said saw blade mount has an accommodating hole; and said saw blade mount further has a limiting member provided in said accommodating hole of said push cover to be inserted into either of said upper and lower slot through the displacement of said push cover.

5. A saw blade quick release mechanism for sawing tool as claimed in claim 4, wherein said accommodating hole is a screw hole, and said limiting member has an adjusting screw provided on said accommodating hole, a first positioning resilient member provided between said adjusting screw and a limiting ball, and said limiting ball embedded in either of said upper and lower limit slots.

6. A saw blade quick release mechanism for sawing tool as claimed in claim 1, wherein said positioning member has a sleeve provided in said fixing hole of said rotary cover and having an end wall and an opening opposite to said end wall, a positioning ball partially protruding outside said sleeve via said opening, and a resilient positioning member provided in said sleeve and abutting between the end wall of said and said positioning ball; and the slot wall of said positioning end of said positioning slot has a first recess, while that of said release end of said positioning slot has a second recess such that when said rotary cover is located at said positioning position, said positioning ball is embedded in said first recess, however when said rotary cover is in said disassembly position, said positioning ball is embedded in said second recess.

7. A saw blade quick release mechanism for sawing tool as claimed in claim 6, wherein said positioning slot in an inverted L shape has a positioning segment having a positioning end and a release end, and an opening segment, the bottom end of which is coupled to said release end of said positioning segment, such that when said rotary cover is in said disassembly position, said positioning ball can be disengaged from said positioning slot through said opening segment.

8. A saw blade quick release mechanism for sawing tool as claimed in claim 7, wherein said positioning segment of said positioning slot further has an inclined bottom wall extending downward from said release end toward said positioning end.

9. A sawing tool comprising:
    a drill holder having an elongated hole;
    a drill bit, the top end of which provided on said drill holder;
    a saw blade quick release mechanism as claimed in claim 1, wherein said saw blade mount is penetrated by said drill bit, and said positioning member passes through the elongated hole of said drill holder; and
    a saw blade detachably provided on the saw blade mount.

* * * * *